(12) United States Patent
Oto

(10) Patent No.: US 7,894,321 B2
(45) Date of Patent: Feb. 22, 2011

(54) LAMINATED WAVE PLATE AND OPTICAL PICKUP USING THE SAME

(75) Inventor: Masayuki Oto, Zama (JP)

(73) Assignee: Epson Toyocom Corporation, Tokyo (JP)

( * ) Notice: Subject to any disclaimer, the term of this patent is extended or adjusted under 35 U.S.C. 154(b) by 468 days.

(21) Appl. No.: 12/066,219

(22) PCT Filed: Sep. 28, 2006

(86) PCT No.: PCT/JP2006/319926

§ 371 (c)(1),
(2), (4) Date: Mar. 7, 2008

(87) PCT Pub. No.: WO2007/046241

PCT Pub. Date: Apr. 26, 2007

(65) Prior Publication Data

US 2008/0310285 A1 Dec. 18, 2008

(30) Foreign Application Priority Data

Sep. 28, 2005 (JP) .............................. 2005-282829

(51) Int. Cl.
*G11B 7/00* (2006.01)
(52) U.S. Cl. .............................. 369/112.22; 369/112.01
(58) Field of Classification Search ............ 369/112.22, 369/112.01, 112.16, 112.17, 112.21; 359/483, 359/485, 494, 500

See application file for complete search history.

(56) References Cited

U.S. PATENT DOCUMENTS

| 6,580,674 B1 | 6/2003 | Nishiyama et al. |
| 6,917,576 B2 | 7/2005 | Nishiyama et al. |
| 2003/0012337 A1 | 1/2003 | Fewster et al. |
| 2005/0062916 A1* | 3/2005 | Matsumoto et al. ......... 349/117 |
| 2005/0180296 A1* | 8/2005 | Ooto ..................... 369/112.22 |
| 2007/0159932 A1* | 7/2007 | Takeshita et al. ......... 369/13.28 |

FOREIGN PATENT DOCUMENTS

| JP | A 05-100114 | 4/1993 |
| JP | A 10-068816 | 3/1998 |
| JP | A 10-340471 | 12/1998 |
| JP | A 2001-101700 | 4/2001 |
| JP | 2004170853 A * | 6/2004 |
| JP | 2004325759 A * | 11/2004 |
| JP | A 2004-335108 | 11/2004 |
| JP | A 2005-293849 | 10/2005 |

* cited by examiner

*Primary Examiner*—Thang V Tran
(74) *Attorney, Agent, or Firm*—Oliff & Berridge, PLC

(57) ABSTRACT

A laminated plate having a wider bandwidth at a desired retardation is provided. A laminated wave plate 1 includes a first wave plate 2 and a second wave plate 3 that are laminated to each other so that respective optical axes of the first wave plate and the second wave plate intersect each other at an angle of 51.5 degrees when the first wave plate has a retardation Γ1 of 360 degrees and an in-plane azimuth of −8 degrees, while the second wave plate has a retardation Γ2 and an in-plane azimuth of 43.5 degrees. Thus, the laminated wave plate 1 functions as a desired retardation Γ2 in a wavelength from 600 nm to 800 nm as a whole.

6 Claims, 15 Drawing Sheets

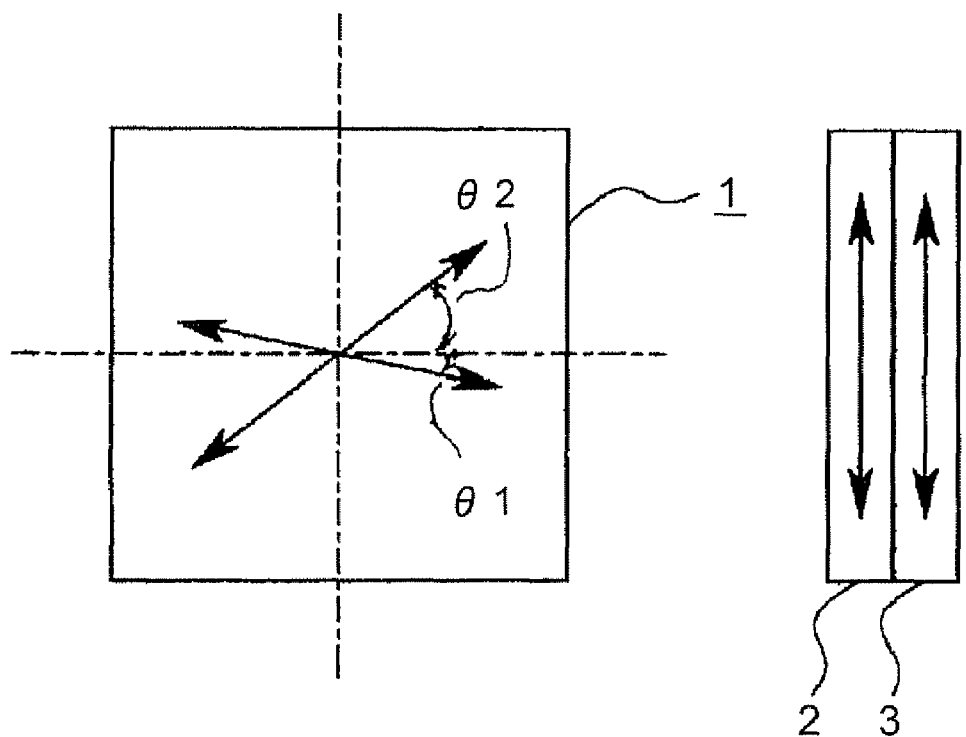
FIG. 1(a)
FIG. 1(b)
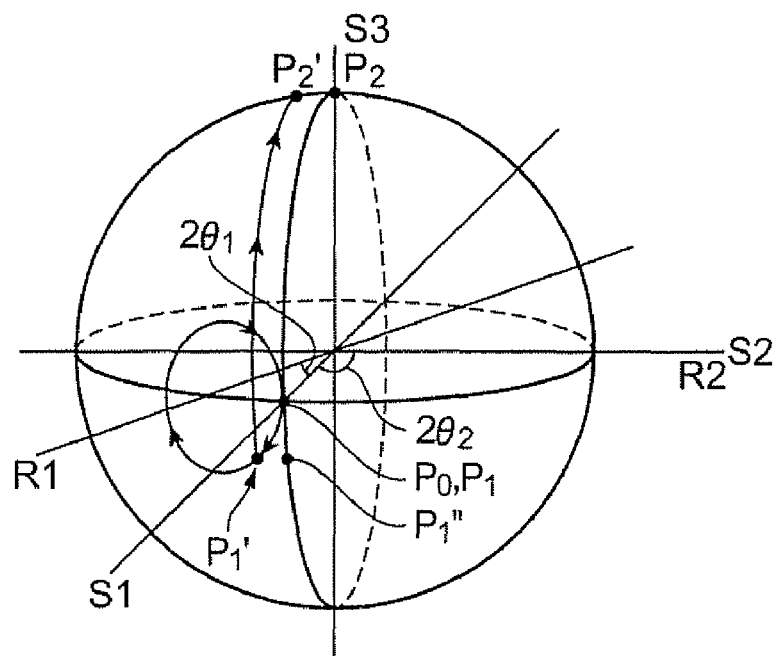
FIG. 1(c)

LAMINATED WAVE PLATE AND OPTICAL PICKUP USING THE SAME

FIELD OF THE INVENTION

The present invention relates to a laminated wave plate, in particular, a laminated wave plate in which a retardation of at least one of wave plates can be set arbitrarily to attain a desired retardation with ease and a further broader band.

BACKGROUND TECHNOLOGY

An optical pickup is used for recording and/or playing information to/in an optical disc such as CD and DVD. The optical pickup includes a quarter-wave plate in order to convert a linearly polarized laser beam irradiated onto the optical disc to a circularly polarized laser beam. The quarter-wave plate is an optical element performing a phase modulation by using a material having birefringence and has a function to convert an incoming light beam of linearly polarized light into a light beam of circularly polarized light. On the other hand, since a retardation of the wave plate is a function of a wavelength, the wave plate has a wavelength dependence in which if a wavelength to be used is changed, the retardation is also changed. Therefore, when a plurality of laser beams having a different wavelength enter the wave plate, a retardation varies depending on each of the wavelengths, causing an issue in which the retardation of the wave plate cannot be maintained constant.

Then, to solve this problem, JP-A-10-68816 discloses a technology that broadens a band of a quarter-wave plate.

FIG. 7 shows an external view of a broadband quarter-wave plate in related art disclosed in JP-A-10-68816. FIG. 7(a) is a plan view of the wave plate as seen from an incident direction whereas the FIG. 7(b) shows a side view. This broadband quarter-wave plate is provided with two wave plates having a predetermined retardation that are laminated. A half-wave plate and a quarter-wave plate are laminated so that respective optical axes are intersected at a predetermined angle, providing performance as a desired quarter-wave plate. As shown in FIG. 7, a laminated wave plate 101 serves as a broadband quarter-wave plate and includes a first wave plate 102 and a second wave plate 103 laminated each other so that an optic axis orientation (hereinafter referred to as an in-plane azimuth) $\theta1$ of the first wave plate 102 is 15 degrees and an in-plane azimuth $\theta2$ of the second wave plate 103 is 75 degrees.

Next, a design method for the broadband quarter-wave plate according to the related art will be explained.

The two wave plates composing the broadband quarter-wave plate 101 will be explained below using a Poincare sphere showing a polarization state in which a light beam is entered into the broadband quarter-wave plate 101 when a retardation $\Gamma1$ of the first wave plate 102 is 180 degrees and an in-plane azimuth thereof is $\theta1$ whereas a retardation $r\Gamma2$ of the second wave plate 103 is 90 degrees and an in-plane azimuth thereof is $\theta2$. Note that each of the retardation $\Gamma1$ (=180 degrees) of the first wave plate 102 and the retardation $\Gamma2$ (=90 degrees) of the second wave plate 103 is a retardation with respect to a reference wavelength (design wavelength) $\lambda0$.

FIG. 8 shows a Poincare sphere showing a polarization state in which a light beam is entered into the broadband quarter-wave plate 101 in related art. Here, the broadband quarter-wave plate 101 is composed of the half-wave plate 102 having an optical axis that is $\theta1$ and the quarter-wave plate 103 having an optical axis that is $\theta2$. However, on the Poincare sphere, the optical axis of the half-wave plate 102 is represented as a straight line R1, whereas the optical axis of the quarter-wave plate 103 is represented as a straight line R2.

FIG. 8 shows that when a light beam enters as linearly polarized light 101 that is in parallel to the equator from a predetermined position P0 on the equator of the Poincare sphere. First, in a case of the reference wavelength $\lambda0$, the light beam is rotated by 180 degrees around the optical axis R1 as a center by the half-wave plate 102 to be shifted to P1, further, rotated by 90 degrees around the optical lens R2 as a center by the quarter-wave plate 103 to reach P2 (North Pole), so that the light beam outputs from the laminated wave plate 101 turns to be circularly polarized light. To make P2 be the pole of the Poincare sphere here, $\theta1$ and $\theta2$ should satisfy a following formula.

$$\theta2 = 2\theta1 + 45 \qquad (101)$$

As described above, when a wavelength of the incident light changes between the wavelengths $\lambda1$ and $\lambda2$ ($\lambda1<\lambda0<\lambda2$) from the reference wavelength (designed wavelength) $\lambda0$, the retardations of the first wave plate 102 and the second wave plate 103 change from 180 degrees and 90 degrees respectively, due to wavelength dependences of the wave plates. At this time, a change amount of the first wave plate 102 is $\Delta\Gamma1$, and a change amount of the second wave plate 103 is $\Delta\Gamma2$. Here, if P1 on the Poincare sphere, which is a position where the incident light reaches by being modulated from P0 by the first wave plate 102, is shifted to P1' due to a change of the retardation of the wave plate along with a change of the wavelength of the incident light, P2 can always reach the polar of the Poincare sphere under a condition where the change amounts $\Delta\Gamma1$ and $\Delta\Gamma2$ are on the same circle connecting P1 and P1' along the surface of the Poincare sphere.

Therefore, when P1 and P1' are approximately connected by a straight line, a relation among $\Delta\Gamma1$, $\Delta\Gamma2$ and $\theta1$ is shown by a cosine theorem as below.

$$\cos \Delta\Gamma2 = 1 - 2(1 - 2\cos 2\theta1)(1 - \cos \Delta\Gamma1) \qquad (102)$$

If the first wave plate 102 and the second wave plate 103 are the same factors for chromatic dispersion, respective retardations are 180 degrees and 90 degrees. Therefore, a relation between $\Delta\Gamma1$ and $\Delta\Gamma2$ satisfies a following formula.

$$\Delta\Gamma1 = 2\Delta\Gamma2 \qquad (103)$$

When the formula (103) is substituted into the formula (102), $\theta1$ obtained is:

$\theta1 = 15°$ (approximately).

Further, $\theta2$ obtained from the formula (101) is:

$\theta2 = 75°$ (approximately.

Accordingly, arranging $\theta1$ and $\theta2$ as described above enables the wavelength dependence of the first wave plate 102 and the wavelength dependence of the second wave plate 103 to be cancelled out each other.

According to the result above, following conditions are essential in order to make the laminated wave plate 101 perform as a broadband quarter-wave plate.

| | | |
|---|---|---|
| The first wave plate 102 | Retardation $\Gamma1$ | 180 degrees |
| | In-plane azimuth $\theta1$ | 15 degrees |
| The second wave plate 103 | Retardation $\Gamma2$ | 90 degrees |
| | In-plane azimuth $\theta2$ | 75 degrees |

Note that the conditions above include approximations. Therefore, optimization is performed by simulations with Mueller matrix and Jones vector or the like so as to obtain optimum characteristics for a practical use.

Patent Document 1 JP-A-10-68816
Patent Document 2 JP-A-10-340471

DISCLOSURE OF THE INVENTION

By the way, a broadband quarter-wave plate is generally used for an optical pickup. FIG. 9 is a configuration diagram of components of an optical pickup generally called as a slim drive. A broadband quarter-wave plate 18 is installed also in one shown in FIG. 9, and as other optical components, a beam splitter 15, a half mirror 16, a collimator lens 17, a total reflection mirror 19, and an objective lens 20 are installed.

On an oblique plane of a prism of the beam splitter 15, the half mirror 16, and the total reflection mirror 19, optical multilayer films 15a, 16a, and 19a are formed. The optical multilayer films 15a, 16a, and 19a are designed to have a retardation of 0 as a target, however, a retardation may occur in some cases due to design restriction, or manufacturing errors. A laser beam outputting from a semiconductor laser 11 or 12 is linearly polarized light.

Here, when the linearly polarized light enters the beam splitter 15 and the half mirror 16, if the linearly polarized light is either one of P-polarized light and S-polarized light, a change of the polarization state by the retardation does not occur even if the optical multilayer films 15a and 16a have retardations.

However, in the total reflection mirror 19, after linearly polarized light is modulated to circularly polarized light by the broadband quarter-wave plate 18, the circularly polarized light enters the total reflection mirror 19. Therefore, if the optical multilayer film 19a of the total reflection mirror 19 has a retardation, there has been an issue in which the circularly polarized light reaches an optical disc 21 in a polarization state being modulated to elliptically polarized light by the total reflection mirror 19.

In order to solve this issue, by measuring a retardation caused by an error in design or a manufacturing error in advance, and correcting the retardation, correction can be performed so as to make the polarization state of the laser beam to be circularly polarized light after the laser beam is reflected by the total reflection mirror 19. By focusing on the broadband quarter-wave plate 18 as the most suitable optical element to control such a retardation of a laser beam, it was examined that whether the broadband quarter-wave plate 18 was able to have a correcting function.

However, the broadband quarter-wave plate 18 was not able to correct the retardation of the total reflection mirror 19 because of its structure to compensate a phase change caused by a wavelength at a retardation of 90 degrees, that is, a wider bandwidth structure. FIG. 10 is a diagram showing a wavelength dependence of a phase change (Retardation: retardation) caused to a laser beam and ellipticity from when a linearly polarized laser beam enters the broadband quarter-wave plate 18 to when the linearly polarized laser beam is reflected by the total reflection mirror 19 while the retardation of the total reflection mirror 19 is 10 degrees or −10 degrees. Compared to a case where the total reflection mirror 19 does not have a retardation (retardation=0 degrees), it is found that the phase change of about plus/minus 10 degrees occurs when a reference retardation is 90 degrees.

Then, an examination on a structure of a wave plate that can have so-called a wider bandwidth while the retardation of the total reflection mirror 19 is corrected, and the phase change by the wavelength is compensated, unlike a structure of the broadband quarter-wave plate 18, is required.

The present invention is intended to address this issue and aims to realize a wave plate that can compensate a phase change so that a polarization state of a laser beam is circularly polarized light after an optical element is output corresponding to a retardation of the optical element such as a mirror and the like arranged between a quarter-wave plate and an optical disc in an optical pickup.

In order to achieve the above-mentioned aim, a laminated wave plate according to one exemplary embodiment includes:

a first wave plate having a retardation $\Gamma 1$ with respect to a wavelength $\lambda$; and a second wave plate having a retardation $\Gamma 2$ with respect to the wavelength $\lambda$, the second wave plate being laminated with the first wave plate so that an optical axis of the first wave plate and an optical axis of the second wave plate are intersected each other. The laminated wave plate is characterized by having the retardation $\Gamma 2$ as a desired retardation in a range of wavelength from $\lambda 1$ to $\lambda 2 (\lambda 1 < \lambda < \lambda 2)$ and being structured to satisfy a following formula (1) if $m = \Gamma 1 / \Gamma 2$, and $\Delta \Gamma 2 = (\Gamma 22 - \Gamma 2)/2$:

$$\cos 2\theta 1 = 1 - (1 - \cos \Delta \Gamma 2)/2(1 - \cos m\Delta \Gamma 2) \qquad (1),$$

where $\theta 1$ is an in-plane azimuth of the first wave plate, $\Gamma 21$ is a retardation with respect to the wavelength $\lambda 1$ of the second wave plate, and $\Gamma 22$ is a retardation with respect to the wavelength $\lambda 2$.

According to another exemplary embodiment the retardation $\Gamma 1$ of the first wave plate of the laminated wave plate is 360 degrees.

According to another exemplary embodiment, the retardation $\Gamma 1$ of the first wave plate of the laminated wave plate is 360 degrees and the in-plane azimuth $\theta 1$ is −8 degrees whereas the retardation of $\Gamma 2$ of the second wave plate is 90 degrees.

An optical pickup according to an exemplary embodiment includes: a semiconductor laser light source outputting two or more of laser light beams having a different wavelength, an objective lens converging the laser light beams output from the semiconductor laser light source; an optical recording medium on which the laser light beams are converged, and a light detector receiving reflective light from the optical recording medium. The laminated wave plate according to an exemplary embodiment is installed in a light way from the laser light source to the optical recording medium or a light way from the optical recording medium to the light detector.

According to the invention, a retardation of the second wave plate composing the laminated wave plate can be arbitrarily set, and by appropriately setting the retardation of the second wave plate, a laminated wave plate having a desired retardation becomes obtainable.

Further, if the laminated wave plate according to the invention is used in an optical pickup, a laser beam of circularly polarized light is securely irradiated to an optical recording medium.

BRIEF DESCRIPTION OF THE DRAWINGS

FIG. 1 is a diagram showing a configuration of a first embodiment of a laminated wave plate according to the present invention. (a) is a plan view, and (b) is a side view, while (c) is a perspective view of a Poincare sphere showing an optical action.

DESCRIPTION OF PREFERRED EMBODIMENT

Embodiments of the invention will now be described in detail with reference to the accompanying drawings.

As described above, in an optical pickup as shown in FIG. 9, in order to correct a retardation of a total reflection mirror 19, a structure of a wave plate enabling a phase compensation for a retardation shifted from a retardation of 90 degrees, for example, 80 degrees, 100 degrees or the like needs to be considered instead of compensating for a phase change with the retardation of 90 degrees of the broadband quarter-wave plate 18 as it is in related art. That is, the inventor has concluded that in a case where the total reflection mirror 19 has a retardation of 10 degrees or −10 degrees, a favorable structure can compensate the phase change due to a wavelength by subtracting 10 degrees or adding 10 degrees from or to a wave plate having a new structure.

In addition, when a case of a retardation of 90 degrees and a case of 80 degrees or 100 degrees are compared, change amounts of the retardations due to wavelengths vary as is well known. Therefore, for the compensation for the change of the retardation, a mechanism that can be adjusted in accordance with the retardation such as 80 degrees, 90 degrees, or 100 degrees is required.

As is well known, the retardation is a vector, and has a direction and a magnitude to act. In a wave plate, the direction to act is adjustable by an optic axis orientation. Therefore, it has been examined that a structure that can compensate the phase change due to the wavelength by changing an optic axis orientation so as to change a direction of an action of a vector even when the retardation is 80 degrees or 100 degrees, for example.

As a result of dedicated investigations in a technique to compensate a phase change due to the wavelength without affecting the retardation when the retardation is 80 degrees or 100 degrees for example, the inventor has concluded a technique to combine a first wave plate having a retardation of 60 degrees and a second wave plate having a retardation of 80 degrees or 100 degrees.

Here, how the invention has been concluded will be described by using a Poincare sphere shown in FIG. 11.

Figure 11A:
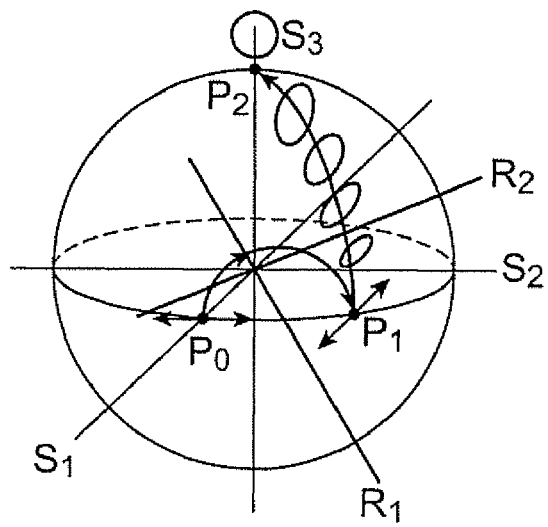
FIG. 11 is a perspective view of a Poincare sphere showing optical characteristics of a laminated wave plate.

FIG. 11(a) is a Poincare sphere showing a polarization state of the broadband quarter-wave plate 18 in related art. Since a retardation of the first wave plate is 180 degrees, a polarizing direction in which linearly polarized light reaches P1 from P0 by a phase modulation of the first wave plate is tilted from a direction of the equator, so that the state of polarized light reaching from P1 to P2 by being modulated by the second wave plate becomes elliptically polarized light having a long axis of an ellipse obliquely tilted. Therefore, adjustment to correct the retardation of the total reflection mirror 19 shown in FIG. 9 becomes hard.

Figure 11B:
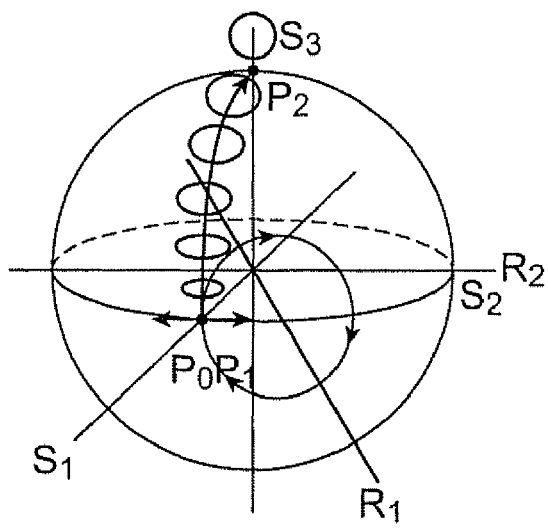

FIG. 11(b) is a Poincare sphere showing a polarization state of a laminated wave plate in a case where the first wave plate having a retardation of 180 degrees is changed to a first wave plate having the retardation of 360 degrees in the broadband quarter-wave plate 18. The state of the polarized light reaching P1 (=P0) from P0 by rotating by 360 degrees due to a phase modulation of the first wave plate and then reaching P2 by a phase modulation of the second wave plate from P1 becomes elliptically polarized light in which the long axis of the ellipse is parallel to the direction of the equator. However, since the phase changes by change of wavelengths of the first wave plate and the second wave plate are in a same direction, and each of the phase changes is added, that is, a relation to cancel out each other is not worked out and thus the compensation is not possible.

Figure 11C:
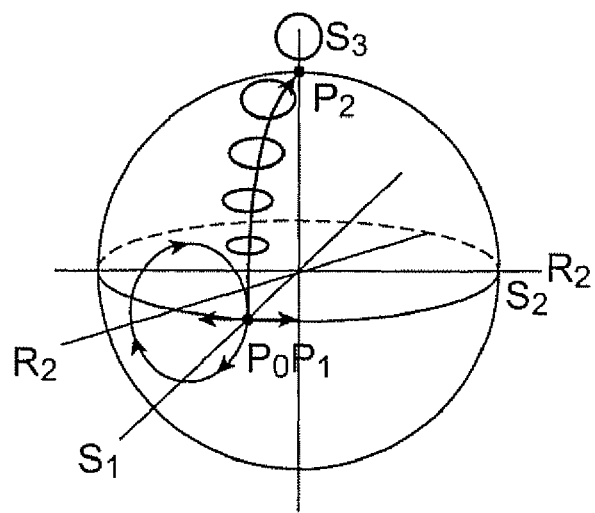

In contrast, as shown in FIG. 11(c), the inventor has realized a laminated compensation wave plate having a new structure, by setting an optical axis of the first wave plate to be in a range from −45 to 0 degrees, and further setting a retardation of the first wave plate to be 360 degrees so that a polarized direction of linearly polarized light at P1 is maintained in the direction of the equator, while allowing a direction of a phase change by a wavelength of the first wave plate to be an opposite direction of a direction of a phase change of the second wave plate so as to establish a relation in which the phase changes are cancelled out each other.

FIG. 1 shows a configuration of a first embodiment of the laminated wave plate according to the invention. FIG. 1(a) is a plan view of a wave plate as seen from an incident direction and the FIG. 1(b) shows a side view, while FIG. 1(c) shows a Poincare sphere showing a polarization state of a light beam that enters into a laminated wave plate 1.

The laminated wave plate 1 includes a first wave plate 2 and a second wave plate 3 that are laminated each other so that respective optical axes of the first wave plate 2 having a retardation of 360 degrees with respect to a wavelength of 710 nm (design wavelength) and an in-plane azimuth of −8 degrees, and the second wave plate 3 having a retardation of 90 degrees with respect to a wavelength of 710 nm (design wavelength) and an in-plane azimuth of 43.5 degrees are intersected each other at 51.5 degrees. Thus the laminated wave plate can function as a quarter-wave plate in a broadband having a wavelength from 600 nm to 850 nm as a whole. Accordingly, a light beam of linearly polarized light entering to the laminated wave plate 1 becomes a light beam of circularly polarized light to output because a retardation is shifted by 90 degrees at the laminated wave plate 1. Here, the laminated wave plate 1 is provided with the first wave plate 2 whose in-plane azimuth of the optical axis is θ1 and the second wave plate 3 whose in-plane azimuth of the optical axis is θ2. On the Poincare sphere, the optical axis of the first wave plate 1 is represented as a straight line R1, whereas the optical axis of the second-wave plate 3 is represented as a straight line R2.

Next, a method for calculating respective parameters related to the first wave plate 2 and the second wave plate 3 composing the laminated wave plate 1 will be described.

A design approach to obtain a wider bandwidth of the laminated wave plate 1 according to the invention is to cancel out a wavelength dependence of the second wave plate 3 with a wavelength dependence of the first wave plate 2. It is characterized by a technical idea in which a retardation Γ1 of the first wave plate 1 is 360 degrees while a desired retardation Γ to realize a wider bandwidth as the first wave plate 1 is a retardation Γ2 of the second wave plate 1. Now, a case to realize a broadband quarter-wave plate (Γ=Γ2=90°) will be described below as a first design example, when the retardation Γ2 of the second wave plate 3 is 90 degrees.

Figure 2:
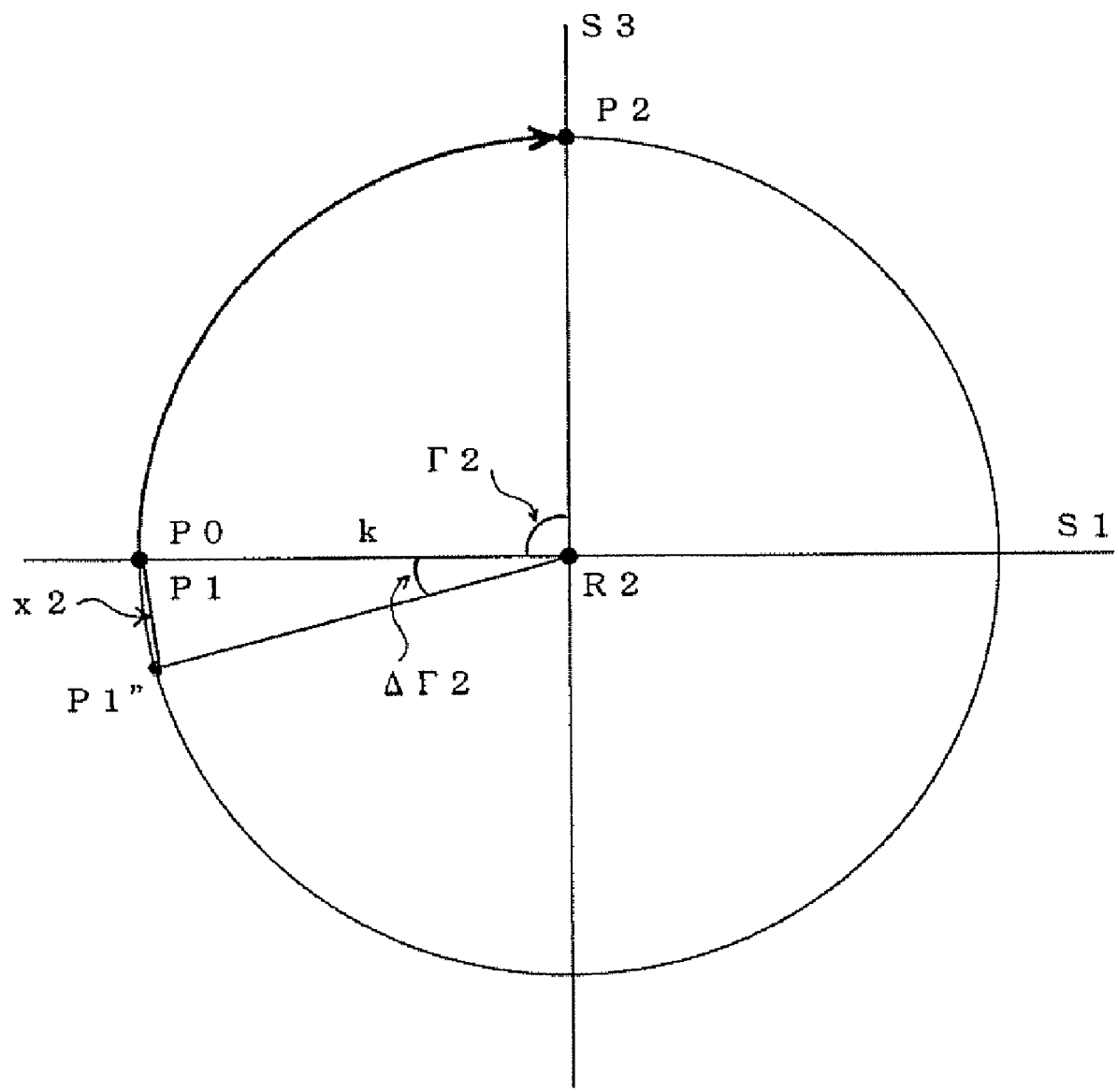
FIG. 2 shows a Poincare sphere to explain a function of a second wave plate 3 of the laminated wave plate according to the invention.
Figure 3:
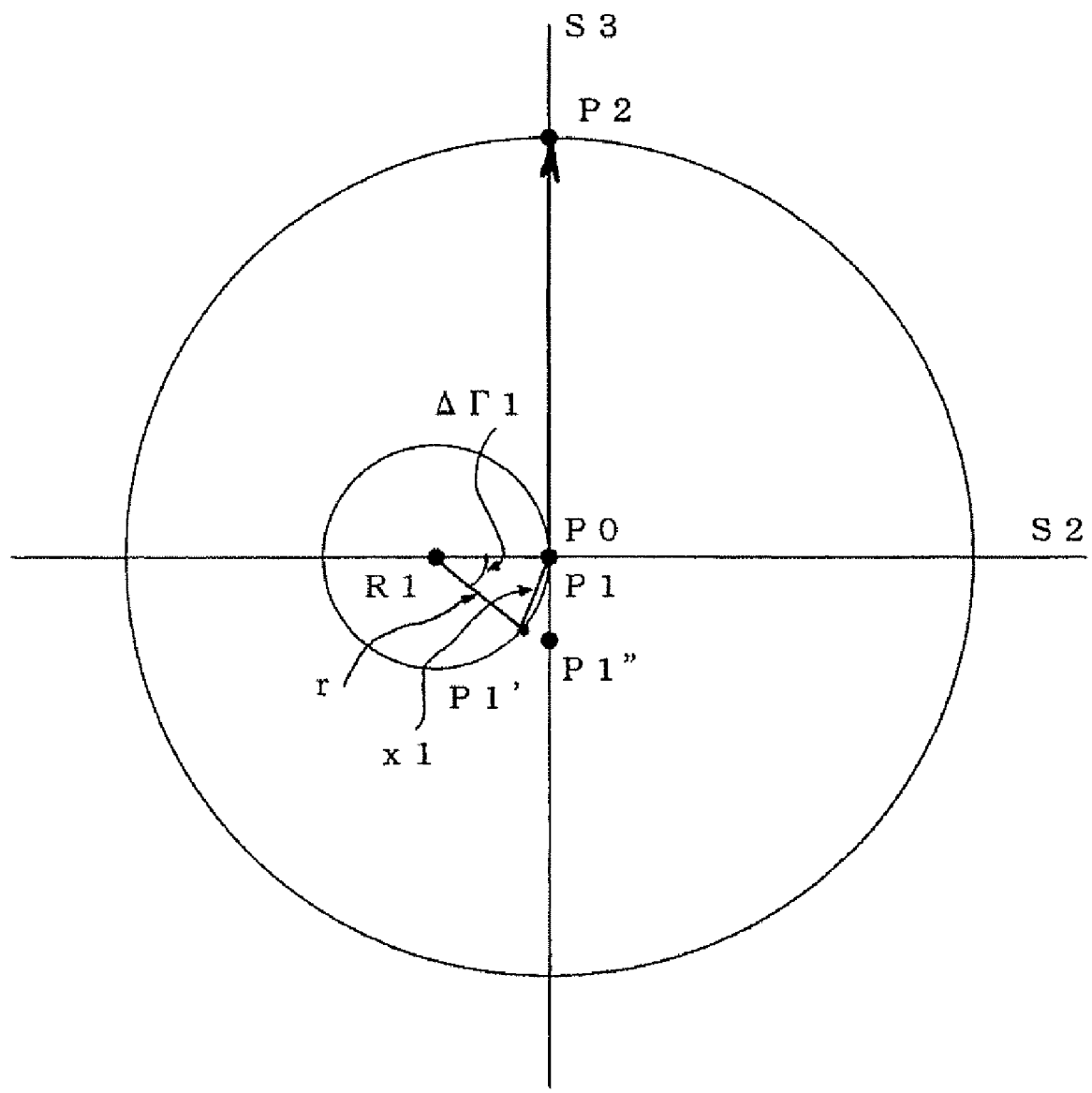
FIG. 3 shows a Poincare sphere to explain a function of a first wave plate 2 of the laminated wave plate according to the invention.

In order to explain a function of the second wave plate 3 of the laminated wave plate 1 according to the invention, FIG. 2 shows a view of a trajectory of a polarization state of a light beam entered to the laminated wave plate 1 seen from a direction of an axis S2 (a diagram projected to an S1S3 plane) on the Poincare sphere shown in FIG. 1(c). In order to explain a function of the first wave plate 2 of the laminated wave plate according to the invention, FIG. 3 shows a view of a trajectory of the polarization state seen from a direction of an axis S1 (a diagram projected to an S2S3 plane). In FIGS. 2 and 3, if a light beam of linearly polarized light enters a predetermined position P0 on the equator of the Poincare sphere, it rotates by 360 degrees around the optical axis R1 as a center by the first wave plate 2 and reaches P1 (P0=P1). Further, it rotates by 90 degrees around the optical axis R2 as a center by the second wave plate 3 and reaches P2 (North Pole). This means that the light beam output from the laminated wave plate 1 becomes circularly polarized light.

Here, when the retardation Γ2 of the second wave plate 3 is changed to a phase change ΔΓ2 due to a change of a wavelength of the incident light, the phase change ΔΓ2 can be cancelled out with the phase change ΔΓ1 in the wavelength of the first wave plate 2, so that a wavelength dependence of the laminated wave plate 1 can be suppressed and functioning as a quarter-wave plate in a broadband is possible.

Further, the phase change ΔΓ2 due to the wavelength of the second wave plate 3 has a constant value that is defined by a chromatic dispersion of a material of a substrate. Therefore, the size of the phase change ΔΓ1 due to the wavelength of the first wave plate 2 is variable by adjusting the in-plane azimuth θ1 of the first wave plate 2.

Consequently, a relational expression of the first wave plate 2 and the second wave plate 3 is derived below.

When the wavelength of the incident light changes between the wavelengths λ1 and λ2 (λ1<λ0<λ2) from the reference wavelength (design wavelength) λ0, the retardations of the first wave plate 2 and the second wave plate 3 change from Γ1 and Γ2 respectively, due to a wavelength dependence of the wave plates. Further, if the retardation of the second wave plate 3 is defined as below:

Γ21: a retardation at a wavelength λ1

Γ22: a retardation at a wavelength λ2, the phase change ΔΓ2 due to the wavelength of the second wave plate 3 shall satisfy a formula below.

$$\Delta\Gamma 2 = (\Gamma 22 - \Gamma 21)/2 \qquad (0)$$

In FIG. 2, a coordinate P0 (P1) on the Poincare sphere is changed into P1" by the phase change ΔΓ2 occurring in the second wave plate 3. If the distance from P0 to P1" is approximately represented by a straight line x2, ΔΓ2 and x2 satisfy a relation of a formula (1) below.

$$x2^2 = 2k^2 - 2k^2 \cos \Delta\Gamma 2 \qquad (1)$$

Note that k indicates a radius of the Poincare sphere.

Next, similarly, in FIG. 3, the coordinate P0 (P1) on the Poincare sphere is changed into P1' due to the phase change ΔΓ1 occurring in the first wave plate 2. If the distance from P0 to P1' is approximately represented by a straight line x1, ΔΓ1 and x1 satisfy a relation of a formula (2) below.

$$x1^2 = 2r^2 - 2r^2 \cos \Delta\Gamma 1 \qquad (2)$$

Note that r is a radius when r is rotated by Γ1 with R1 as a rotation axis.

In addition, r can be shown by a formula (3) below using the in-plane azimuth θ1 of the first wave plate 2.

$$r^2 = 2k^2 - 2k^2 \cos 2\theta 1 \qquad (3)$$

Further, a formula (4) is obtained when the formula (3) is substituted for the formula (2).

$$x1^2 = 4k^2(1 - \cos 2\theta 1)(1 - \cos \Delta\Gamma 1) \qquad (4)$$

In order to cancel out the phase changes of the first wave plate 2 and the second wave plate 3 each other, x1 needs to be nearly equal to x2. According to the formulae (1) and (4), following relations are established.

$$x1^2 = x2^2$$

$$2k^2 - 2k^2 \cos \Delta\Gamma 2 = 4k^2(1 - \cos 2\theta 1)(1 - \cos \Delta\Gamma 1)$$

Further, by normalizing k and organizing it, a formula (5) is obtained.

$$\cos 2\theta 1 = 1 - (1 - \cos \Delta\Gamma 2)/2(1 - \cos \Delta\Gamma 1) \qquad (5)$$

Next, a formula (6) is obtained supposing the substrates of the first wave plate 2 and the second wave plate 3 are made of materials having the same dispersion. The formula (6) is obtained when it is:

$$\Gamma 1/\Gamma 2 = m.$$

$$\Delta\Gamma 1 = m\Delta\Gamma 2 \qquad (6)$$

Thus, when the formula (6) is substituted for the formula (5), a formula (7) is obtained:

$$\cos 2\theta 1 = 1 - (1 - \cos \Delta\Gamma 2)/2(1 - \cos \Gamma 2) \qquad (7)$$

The formula (7) shows that the in-plane azimuth θ1 of the first wave plate 2 is defined by the phase change ΔΓ2 caused by the second wave plate 3.

Next, by using the formulae above, detailed parameters of the first wave plate and the second wave plate composing the laminated wave plate are calculated.

As a specific example, parameters in a case of a laminated wave plate that functions as a quarter-wave plate in a broadband of a wavelength from 600 nm to 800 nm are calculated.

Then, if the retardation Γ1 of the first wave plate 2 is 360 degrees and the retardation Γ2 of the second wave plate 3 is 90 degrees, a formula below is established.

$$m = \Gamma1/\Gamma2 = 4 \qquad (5)$$

Further, if the material of the substrate of the wave plate is crystal quartz, the phase change ΔΓ2 of the second wave plate 3 with a wavelength in a range from 600 nm to 800 nm is about plus/minus 10 degrees with respect to a center wavelength of 700 nm.

i.e. ΔΓ2=10 degrees

Then, if values in which m equals 4 and ΔΓ2 equals 10 degrees are substituted for the formula (7), the in-plane azimuth θ1 of the first wave plate 2 is nearly equal to 7.32 degrees.

Namely, if the retardation Γ1 of the first wave plate 2 is 360 degrees and the in-plane azimuth θ1 is 7.32 degrees, and the retardation Γ2 of the second wave plate 3 is 90 degrees and the in-plane azimuth θ2 is 45 degrees, the laminated wave plate functioning in a broadband of a wavelength from 600 nm to 800 nm as a quarter-wave plate is realized.

However, the formula (7) includes some approximate conditions. Therefore, further detailed calculation is necessary to obtain the best value. A determinant to calculate a polarization state can be shown by a formula (8) below using Jones vector or Mueller matrix.

$$E = R2R1I \qquad (8)$$

E shows an emergence polarization state, I shows an incident polarization state, R1 shows the retardation of the first wave plate, and R2 shows the retardation of the second wave plate.

Then, an optimum value of each parameter for the first wave plate and the second wave plate is calculated according to a simulation using the formula (8). The result of the simulation is shown below. In all wave plates, a design wavelength is 710 nm and m is 4.

| The first wave plate | Retardation Γ1 | 360 degrees |
| --- | --- | --- |
|  | In-plane azimuth θ1 | −8 degrees |
| The second wave plate | Retardation Γ2 | 90 degrees |
|  | In-plane azimuth θ2 | 43.5 degrees |

According to the above, it is considered that in θ1 and θ2, an angle obtained from the formula (7) or around the angle that is within a range of plus/minus 5 degrees is optimum.

Since this specific example is the same as the first embodiment shown in FIG. 1, detailed description about the configuration and so on are omitted.

Figure 4:
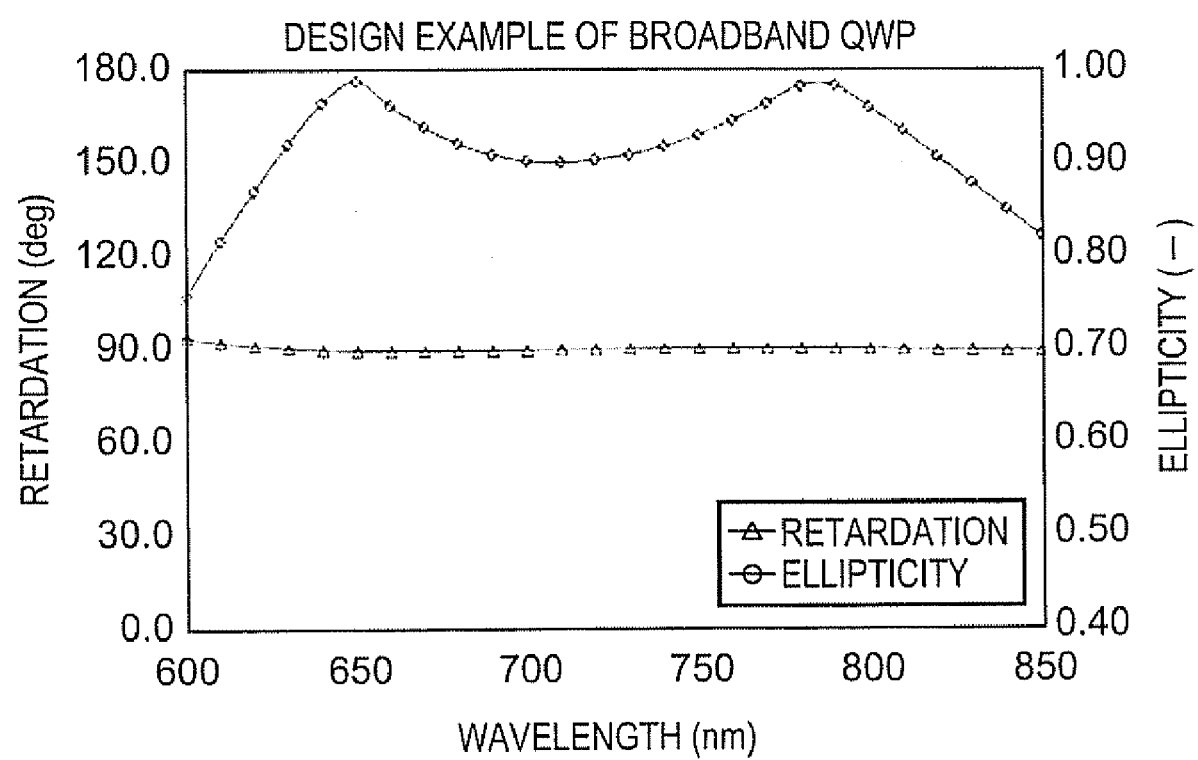
FIG. 4 is a graph showing wavelength dependences of retardation and ellipticity of the laminated wave plate according to the invention when parameters are set according to the first embodiment.

FIG. 4 is a graph showing wavelength characteristics of retardation and ellipticity of the laminated wave plate according to the invention when the parameters according to the first embodiment are set. As shown in FIG. 4, the wavelength characteristic of the retardation keeps 90 degrees throughout a range from 600 nm to 800 nm. Further, the wavelength characteristic of the ellipticity shows a value nearly close to 1 around 650 nm and 780 nm. Accordingly, it is found that the laminated wave plate according to this embodiment is suitable for an optical pickup for CD and DVD.

TABLE 1

| Total reflection mirror | First wave plate | | Second wave plate | |
| --- | --- | --- | --- | --- |
| Retardation (deg) | Γ1(deg) | θ1 | Γ2(deg) | θ2 |
| 10 | 360 | −8 | 80 | 43.5 |
| 0 | 360 | −8 | 90 | 43.5 |
| −10 | 360 | −8 | 100 | 43.5 |

Figure 9:
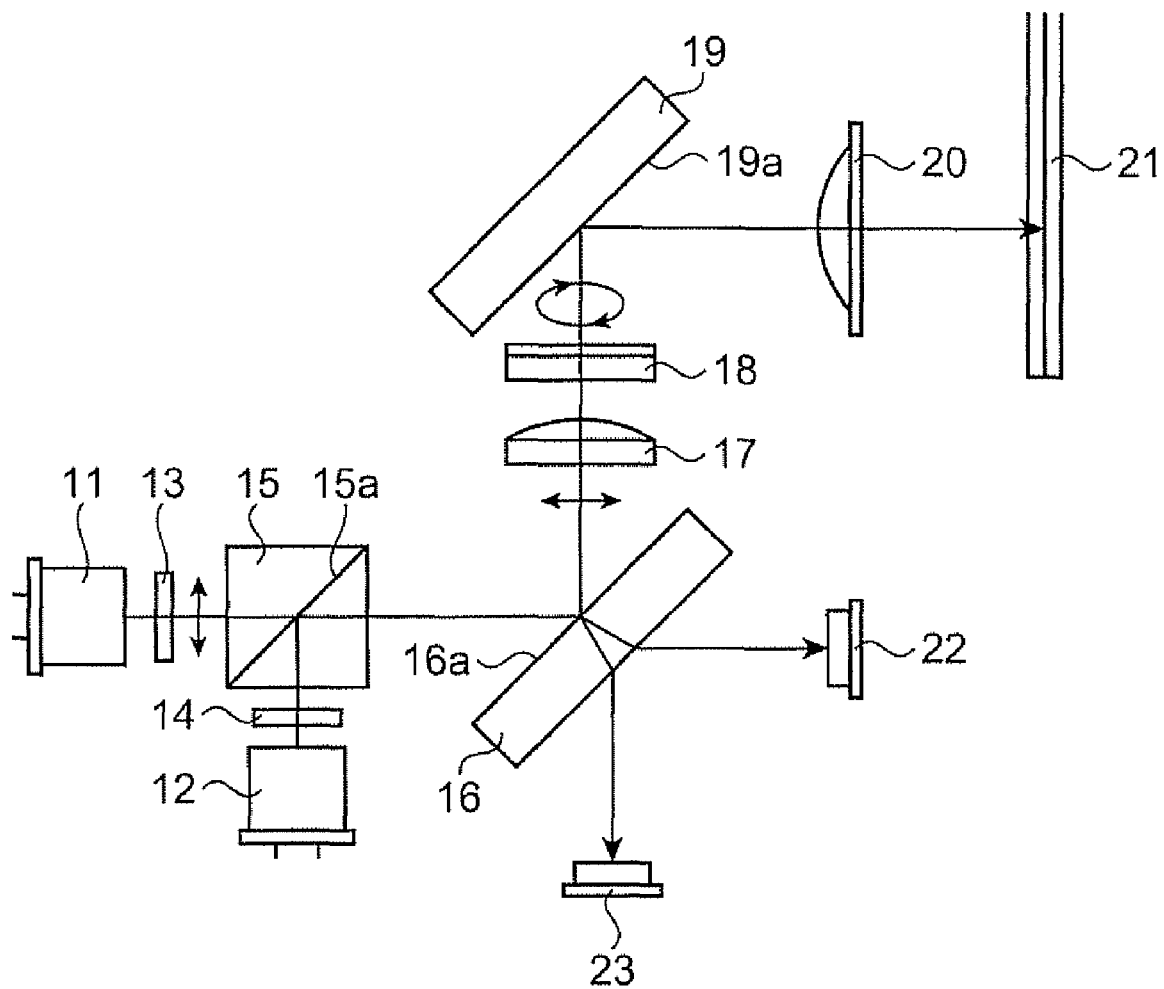
FIG. 9 is a diagram showing a configuration example of optical components of an optical pickup.
Figure 10:
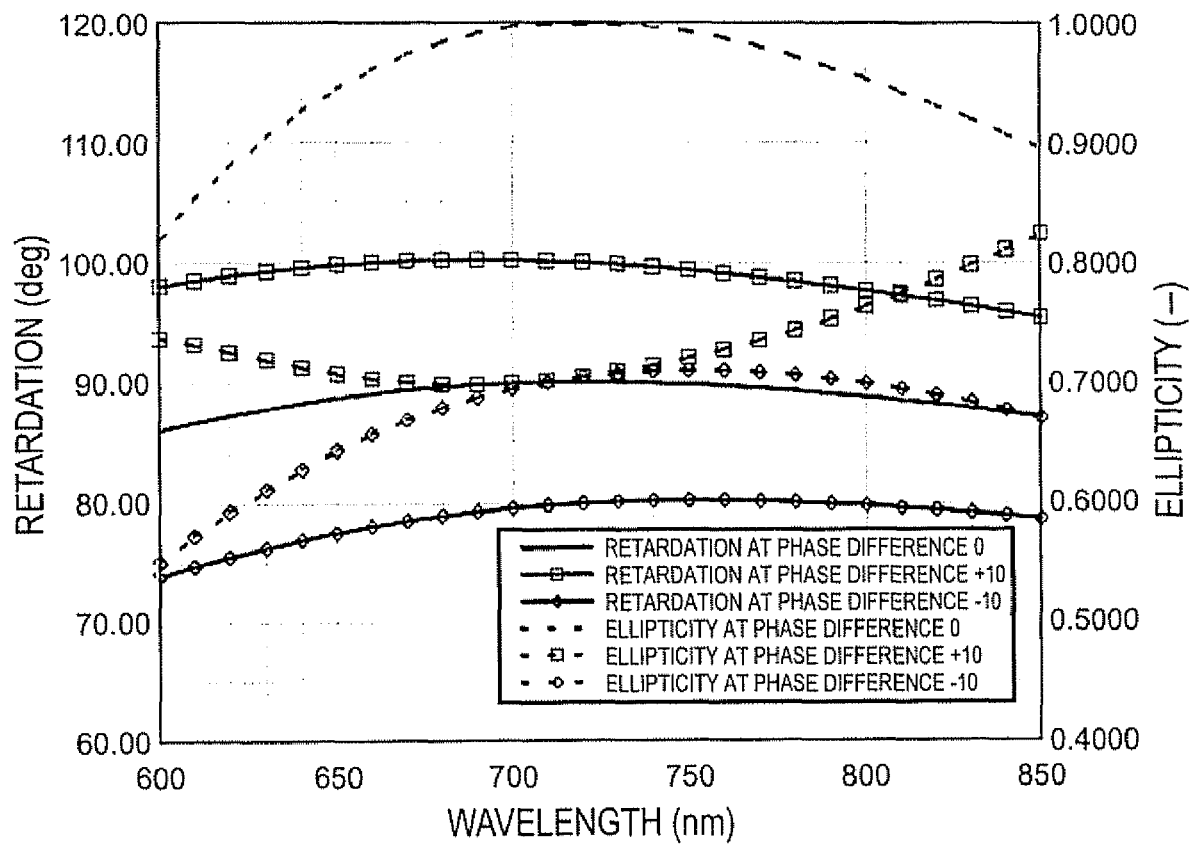
FIG. 10 is a graph showing a wavelength dependence of the broadband quarter-wave plate according to related art as disclosed in JP-A-10-68816.

Table 1 shows a design specification of the first wave plate 1 in a case where the laminated wave plate 1 according to the invention is installed to the optical pickup shown in FIG. 9 instead of the broadband quarter-wave plate 18 in related art. The specifications of the first wave plate 2 and the second wave plate 3 are designed according to respective retardations of the total reflection mirror 19 which are 0 degrees, −10 degrees, and +10 degrees. That is, the retardation of the first wave plate 2 is set to 360 degrees, and the retardation of the second wave plate 3 is designed corresponding to the retardation of the total reflection mirror such as 80 degrees, 90 degrees, or 100 degrees.

Figure 12:
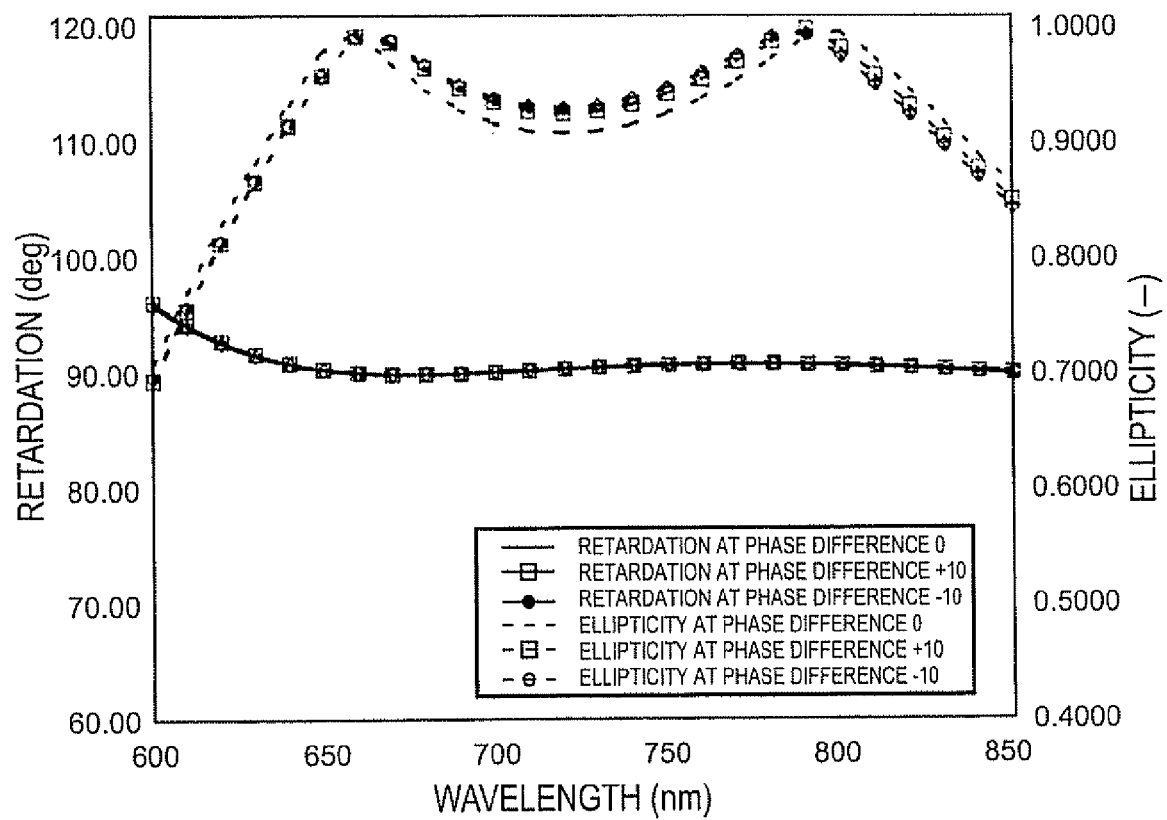
FIG. 12 is a graph showing wavelength dependences of retardation and ellipticity of a laminated wave plate according to the invention.

FIG. 12 is a diagram showing a wavelength dependence of a phase change (Retardation: retardation) and ellipticity caused to a laser beam from when the laser beam of linearly polarized light enters the laminated wave plate 1 to when it is reflected by the total reflection mirror 19. When a case where the total reflection mirror 19 has no retardations (retardation=0 degrees) and a case where it has a retardation of plus/minus 10 degrees are compared, it is found that the retardations are equally 90 degrees. That is, it has been verified that the polarization state of the laser beam reflected by the total reflection mirror 19 can maintain circularly polarized light.

Further, the laminated wave plate according to the invention has a feature in which a band can be broader if a retardation to broad the band is larger. Therefore, by adopting the invention to a broadband half-wave plate, a laminated wave plate having a broader band can be realized.

Here, as a second embodiment, detailed parameters for the laminated wave plate that functions as a half-wave plate in a broad band of a wavelength from 400 nm to 800 nm are calculated By using the same calculation method as that of the first embodiment, an optimum value of each parameter for the first wave plate and the second wave plate is calculated when the retardation Γ1 of the first wave plate 2 is 360 degrees, and the retardation Γ2 of the second wave plate 3 is 180 degrees. The result is shown below. In all wave plates, a design wavelength is 550 nm and m is 2.

| The first wave plate | Retardation Γ1 | 360 degrees |
| --- | --- | --- |
|  | In-plane azimuth θ1 | −21 degrees |
| The second wave plate | Retardation Γ2 | 180 degrees |
|  | In-plane azimuth θ2 | 43 degrees |

Figure 5A:
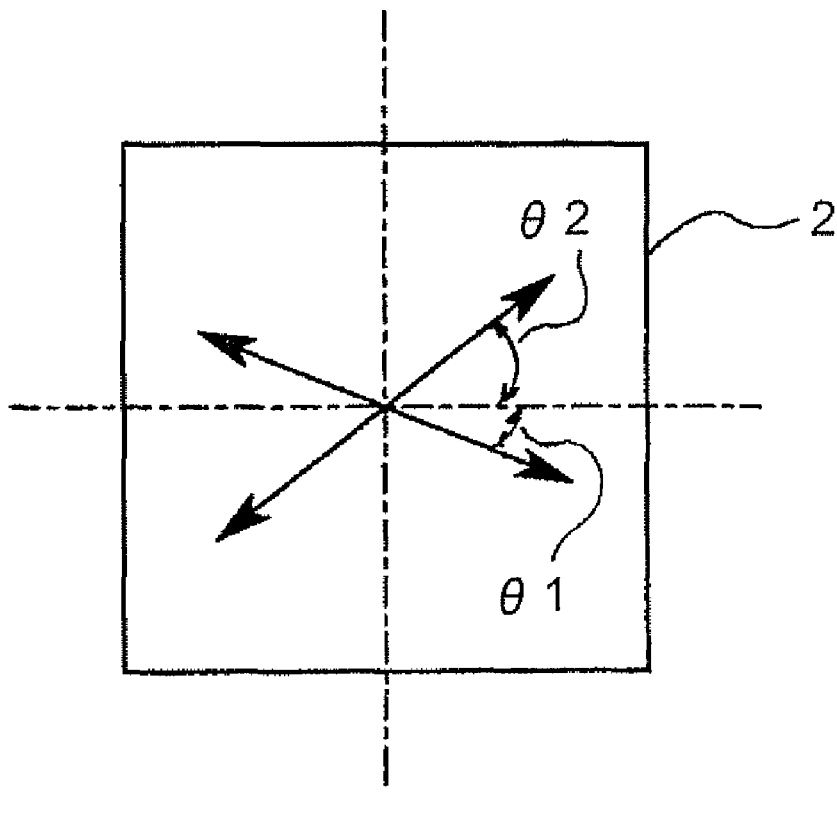
FIG. 5 is a diagram showing a configuration of a second embodiment of the laminated wave plate according to the invention. (a) is a plan view while (b) is a side view.
Figure 5B:
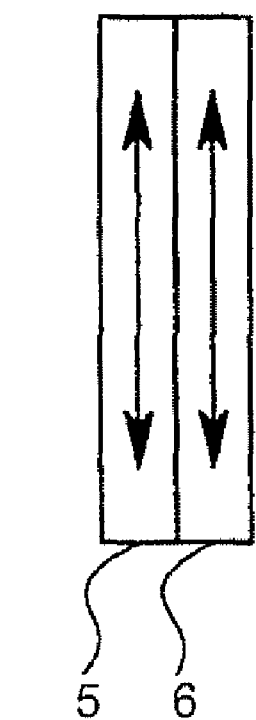

FIG. 5 shows a configuration of the second embodiment of the laminated wave plate according to the invention. FIG. 5(a) is a plan view of a wave plate as seen from an incident direction whereas the FIG. 5(b) shows a side view. A laminated wave plate 4 includes a first wave plate 5 and a second wave plate 6 that are laminated each other so as to have a structure of a half-wave plate as an embodiment. The first wave plate 5 having a retardation of 360 degrees with respect to a wavelength of 550 nm and an in-plane azimuth θ1 of −21 degrees, and the second wave plate 6 having a retardation of 180 degrees and an in-plane azimuth θ2 of 43 degrees are laminated so that respective optical axes are intersected each other at 64 degrees, thereby functioning as a half-wave plate as a whole in a wavelength from 400 nm to 800 nm. Therefore, linearly polarized light entering this laminated wave plate 4 is converted to linearly polarized light having a polarized surface rotated by 90 degrees with respect to the incident light.

Figure 6:
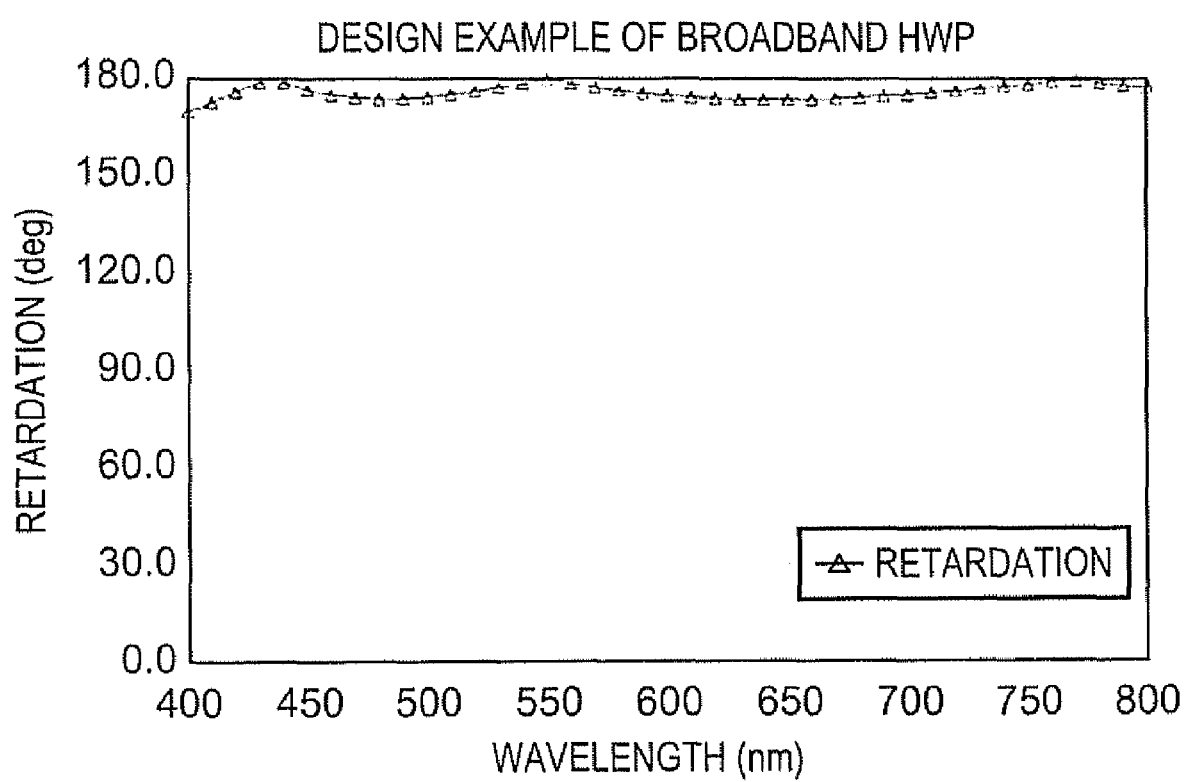
FIG. 6 is a graph showing a wavelength dependence of retardation of the laminated wave plate according to the invention when parameters are set according to the second embodiment.
Figure 7A:
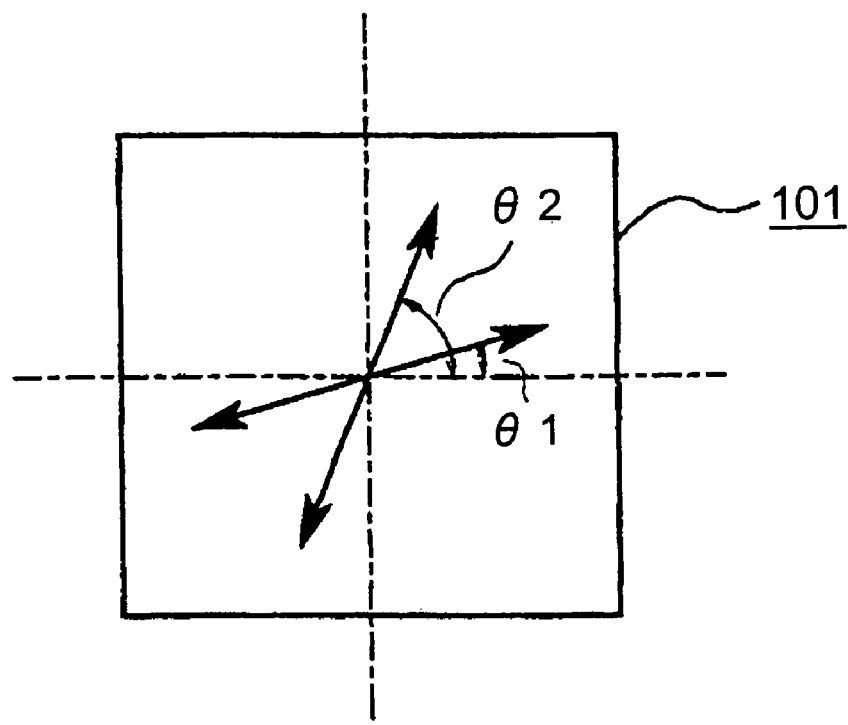
FIG. 7 is a diagram showing an example of an external configuration of a broadband quarter-wave plate in related art as disclosed in JP-A-10-68816, (a) is a plan view while (b) is a side view.
Figure 7B:
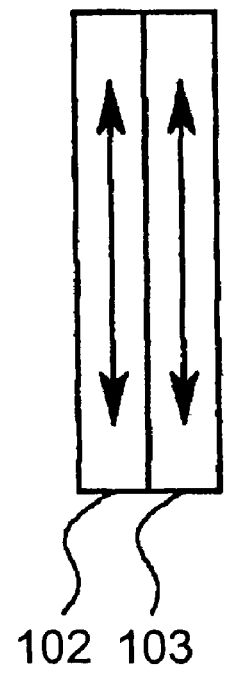
Figure 8:
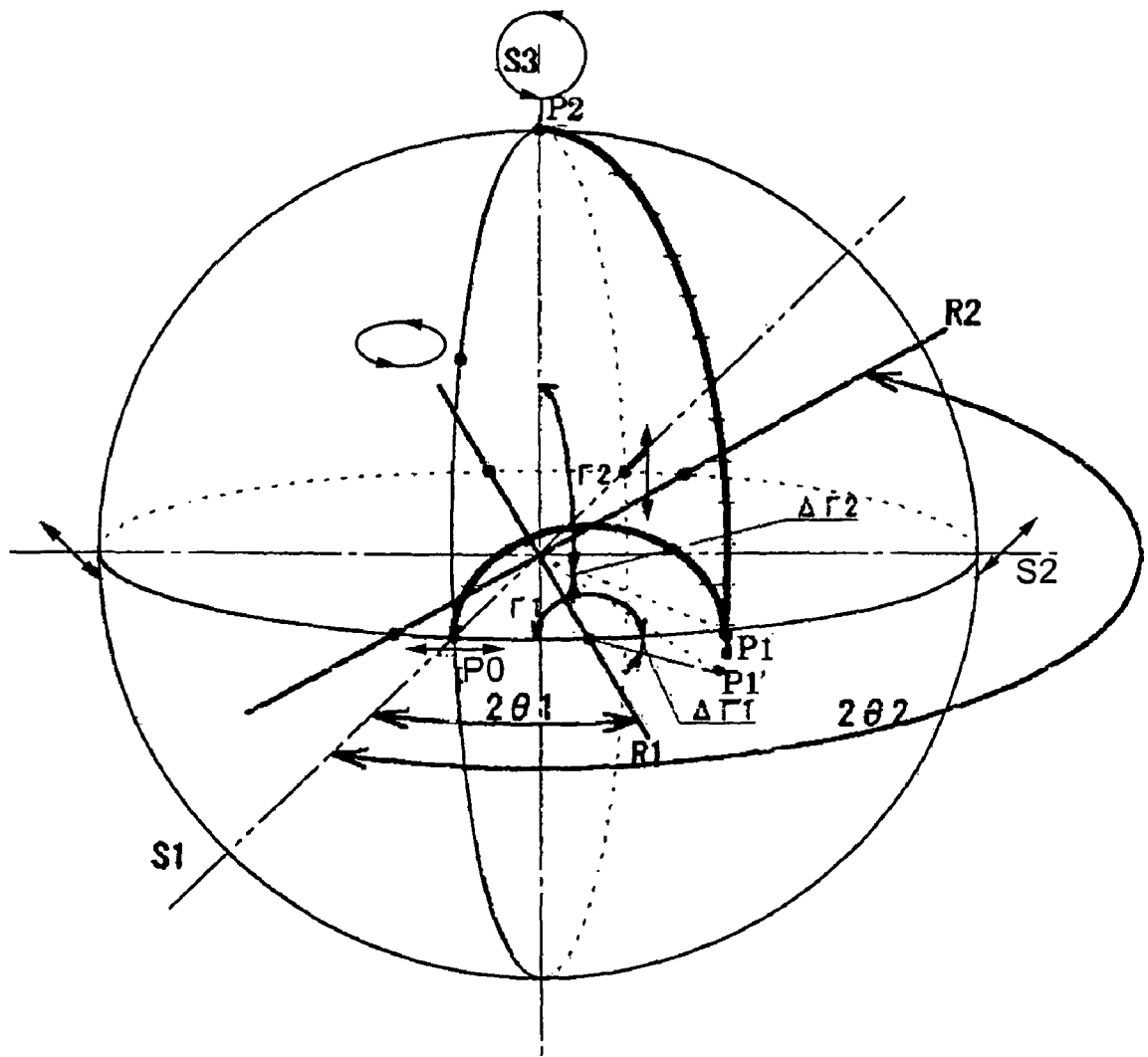
FIG. 8 is a perspective view of a Poincare sphere showing an optical action of a laminated wave plate serving as a quarter-wave plate in related art.

FIG. 6 is a graph showing a wavelength characteristic of retardation of the laminated wave plate according to the invention when the parameters according to the second embodiment are set. As shown in FIG. 6, the wavelength characteristic of the retardation keeps at about 180 degrees throughout a range from 400 nm to 800 nm. Accordingly, it is found that the band becomes broader compared to a broadband half-wave plate according to related art.

As the above, the broadband quarter-wave plate and the broadband half-wave plate are explained as the laminated wave plate according to the invention. However, the invention is not limited to the above. As it makes it possible to arbitrarily set the retardation of the second wave plate composing a laminated wave plate, the laminated wave plate having a desired retardation is obtained by setting the retardation of the second wave plate appropriately. Such features of the invention can be applicable to wave plates other than the above.

In the invention as described above, the retardation Γ2 of the second wave plate 3 is set to a desired retardation, enabling compensation for retardation in a wide range of wavelengths at the desired retardation. This method will now be described.

In a case of compensating a change of the retardation due to a wavelength, the in-plane azimuth θ1 of the first wave plate 2 and the retardation change ΔΓ2 of the second wave plate 3 can be set to nearly satisfy the formula (7). Further, by the formula (7), it is possible to estimate the setting as when the retardation of Γ2 is large, θ1 can be set to large, and when the retardation of Γ2 is small, θ1 can be set to be small.

Since the formula (7) is an approximation formula, detailed calculation was performed by using Mueller matrix on the assumption that retardation is compensated in a range from 600 nm to 850 nm as an example. Appropriate conditions for each retardation are shown in a table below.

TABLE 2

| | First wave plate | | Second wave plate | |
| --- | --- | --- | --- | --- |
| Desired retardation | Γ1 deg | θ1 deg | Γ2 deg | θ2 deg |
| 30 | 360 | −2.5 | 30 | 45 |
| 60 | 360 | −5 | 60 | 45 |
| 90 | 360 | −8 | 90 | 45 |
| 120 | 360 | −11 | 120 | 45 |
| 150 | 360 | −14 | 150 | 45 |
| 180 | 360 | −16 | 180 | 45 |
| 210 | 360 | −20 | 210 | 45 |
| 240 | 360 | −22 | 240 | 45 |
| 270 | 360 | −25 | 270 | 45 |
| 300 | 360 | −29 | 300 | 45 |
| 330 | 360 | −35 | 330 | 45 |

Figure 13:
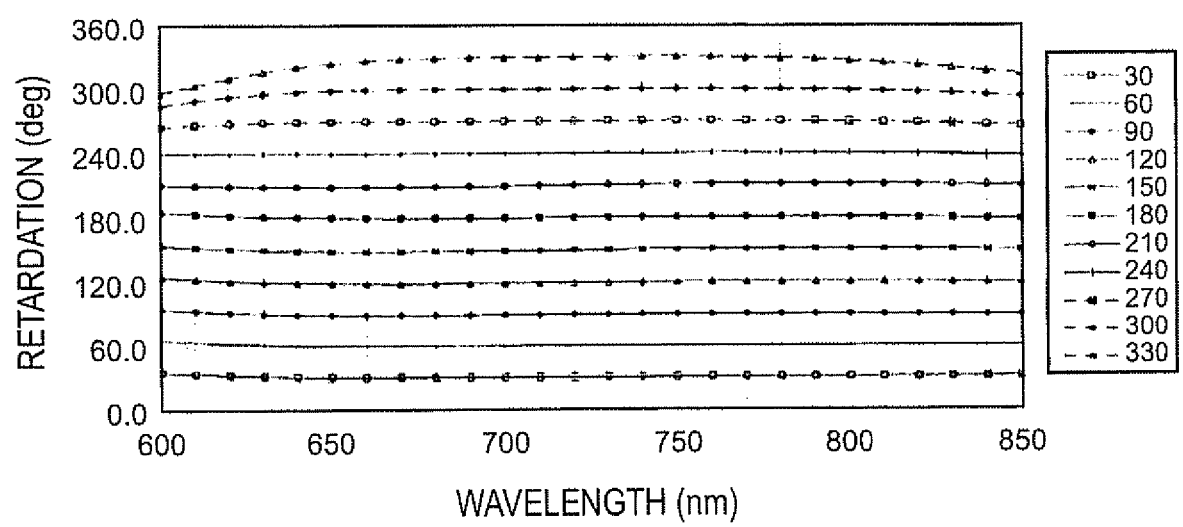
FIG. 13 is a graph showing a wavelength dependence of retardation of a laminated wave plate that can achieve a wider broadband with a desired retardation according to the laminated wave plate of the invention.

A wavelength dependence of the laminated wave plate 1 structured based on each design specification shown in Table 2 is shown in FIG. 13. In principle, wavelength compensation is possible in a range of retardation from 0 to 360 degrees. However, a favorable compensation characteristic is obtained in a range of retardation from 30 to 270 degrees. However, it shows that the range of wavelength enabling compensation is narrowed around when it exceeds 300 degrees. According to this, it is found that it is suitable for compensating a retardation from 30 to 270 degrees approximately.

Next, a case where another optical element installed in an optical pick up provided with a quarter-wave plate has a retardation, and a laser beam entering into the quarter-wave plate has already been elliptically polarized light by the retardation is examined. Even when the laser beam which was linearly polarized light has a retardation of 10 degrees, and thus the laser beam in a polarization state of elliptically polarized light enters the laminated wave plate 1, the laser beam can output from the laminated wave plate 1 as circularly polarized light by adjusting the retardations Γ1 and Γ2 of the first wave plate 2 and the second wave plate 3, and the in-plane azimuths θ1 and θ2.

Figure 14:
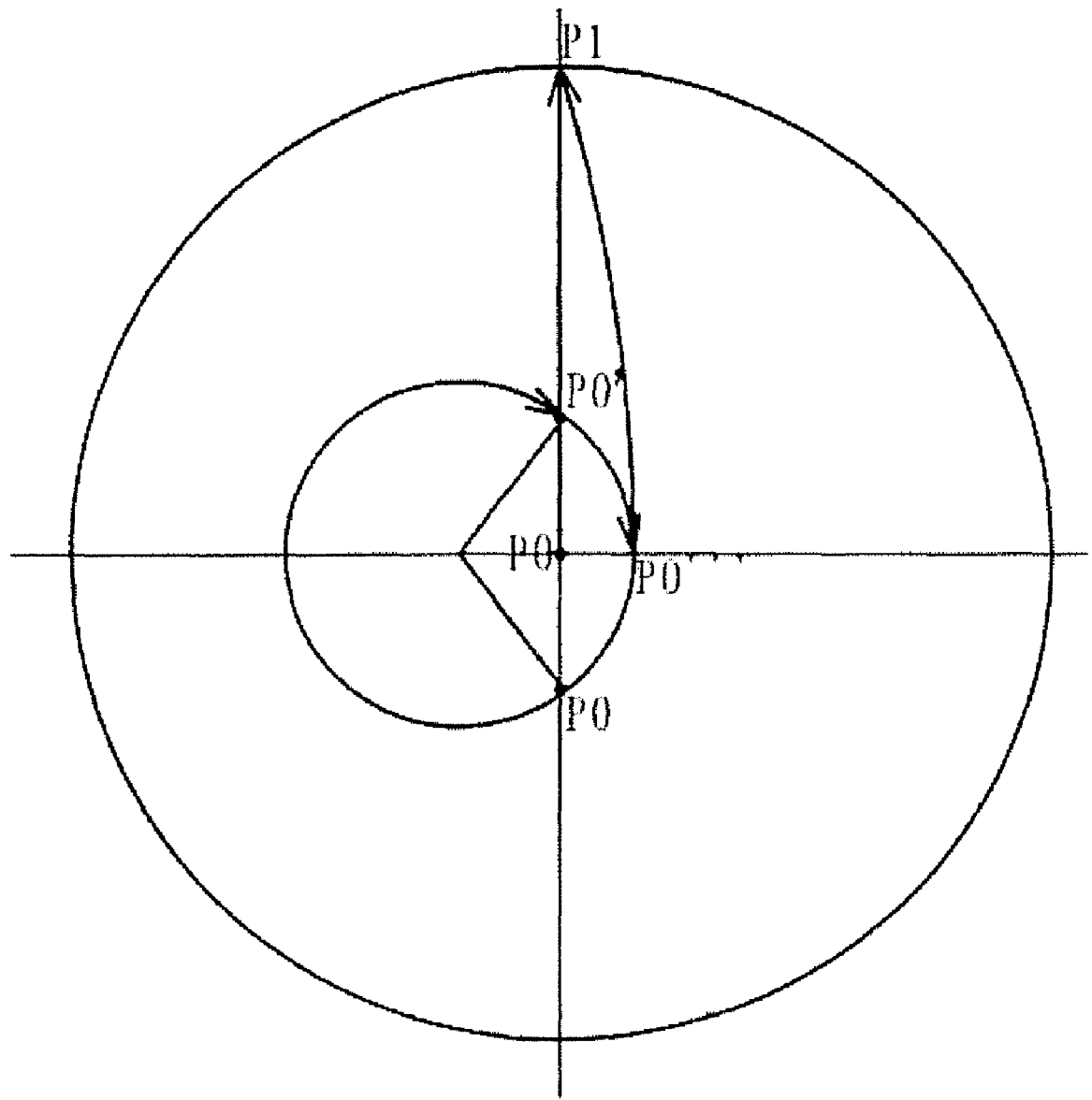
FIG. 14 is a plan view of a Poincare sphere showing optical characteristics of a laminated wave plate having a correction function according to the invention.

The method for adjusting is described using a Poincare sphere shown in FIG. 14. When incident light has a retardation, a polarization state of the incident light is P0' or P0'', but not P0. Because of this, the retardation of the first wave plate 2 is set to be larger in the former case, or set to be smaller in the latter case so as to shift it to P0''' on the equator. Subsequently, by adjusting an optic axis orientation of the second wave plate 3, it is shifted from P0''' so as to reach P1, so that it can output from the laminated wave plate 1 as circularly polarized light.

Figure 15:
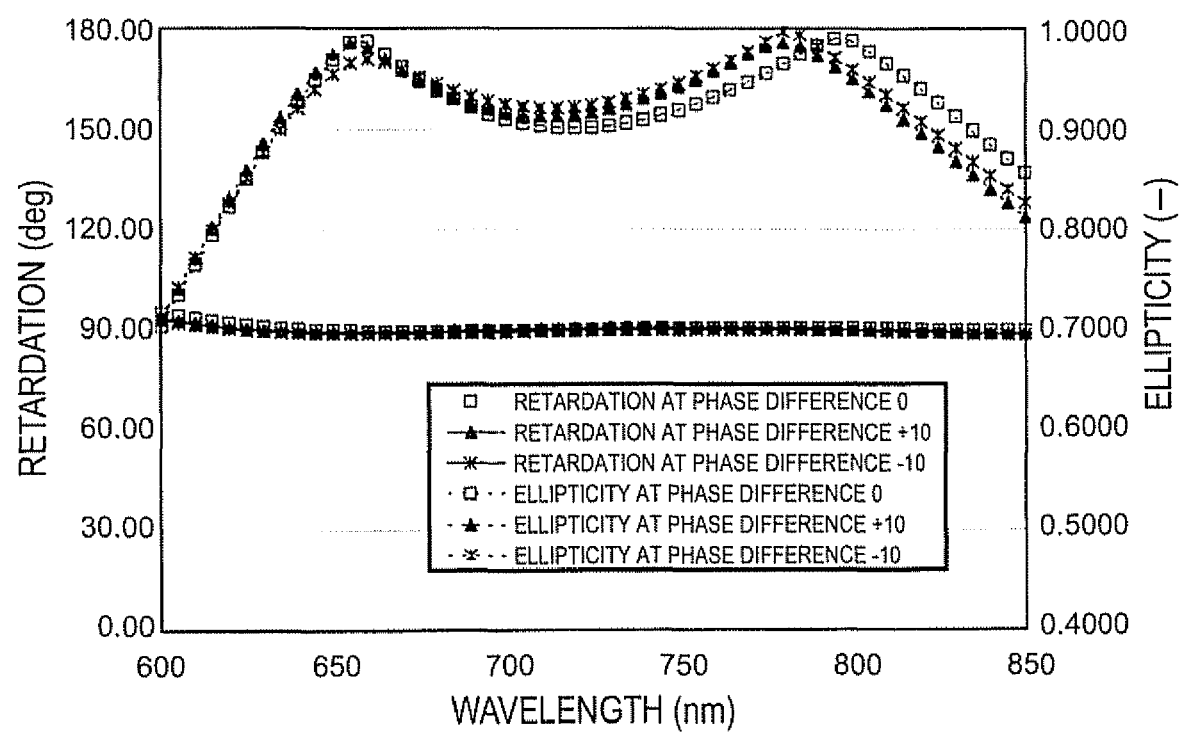
FIG. 15 is a graph showing wavelength dependences of retardation and ellipticity of a laminated wave plate having a correction function according to the invention.

In this method, assuming that the polarization of the incident laser beam has a retardation of −10, 0, or +10 degrees, specific calculation was performed by using Muller matrix. An optimal design example for each of them is shown in Table 3. Further, results calculated by Muller matrix in these design conditions are shown in FIG. 15. Even if incident polarized light is elliptically polarized light, nearly same compensation can be performed by adjustment shown in Table 3.

TABLE 3

| Retardation of incident light | First wave plate | | Second wave plate | |
| --- | --- | --- | --- | --- |
| | Γ1 deg | θ1 deg | Γ2 deg | θ2 deg |
| −10 | 323 | −6.5 | 90 | 45.5 |
| 0 | 360 | −8 | 90 | 43.5 |
| 10 | 399 | −6 | 90 | 45.5 |

The invention claimed is:

1. A laminated wave plate, comprising:

a first wave plate having a retardation Γ1 with respect to a wavelength λ; and a second wave plate having a retardation Γ2 with respect to the wavelength λ, the second wave plate being laminated with the first wave plate so that an optical axis of the first wave plate and an optical axis of the second wave plate are intersected each other, wherein the laminated wave plate has the retardation Γ2 as a desired retardation in a range of wavelength from λ1 to λ2, where λ1<λ<λ2 and is structured to satisfy following formulae (1) and (2) if m=Γ1/Γ2, and ΔΓ2=(Γ22−Γ21)/2:

$$323° < \Gamma 1 \leq 399° \quad (1); \text{ and}$$

$$\cos 2\theta 1 = 1 - (1 - \cos \Delta\Gamma 2)/(2(1 - \cos m\Delta\Gamma 2)) \quad (2),$$

where θ1 is an in-plane azimuth of the first wave plate, Γ21 is a retardation with respect to the wavelength λ1 of the second wave plate, and Γ22 is a retardation with respect to the wavelength λ2.

2. The laminated wave plate according to claim 1, wherein the retardation Γ1 of the first wave plate is 360 degrees.

3. The laminated wave plate according to claim 2, wherein the retardation Γ1 of the first wave plate is 360 degrees and the in-plane azimuth θ1 is −8 degrees whereas the retardation Γ2 of the second wave plate is 90 degrees.

4. An optical pickup, comprising:
a semiconductor laser light source outputting two or more of laser light beams having a different wavelength;
an objective lens converging the laser light beams output from the semiconductor laser light source;
an optical recording medium on which the laser light beams are converged; and
a light detector receiving reflective light from the optical recording medium, wherein the optical pickup has the laminated wave plate according to claim 1 installed in a light way from the laser light source to the optical recording medium or a light way from the optical recording medium to the light detector.

5. An optical pickup, comprising:
a semiconductor laser light source outputting two or more of laser light beams having a different wavelength;
an objective lens converging the laser light beams output from the semiconductor laser light source;
an optical recording medium on which the laser light beams are converged; and
a light detector receiving reflective light from the optical recording medium, wherein the optical pickup has the laminated wave plate according to claim 2 installed in a light way from the laser light source to the optical recording medium or a light way from the optical recording medium to the light detector.

6. An optical pickup, comprising:
a semiconductor laser light source outputting two or more of laser light beams having a different wavelength;
an objective lens converging the laser light beams output from the semiconductor laser light source;
an optical recording medium on which the laser light beams are converged; and
a light detector receiving reflective light from the optical recording medium, wherein the optical pickup has the laminated wave plate according to claim 3 installed in a light way from the laser light source to the optical recording medium or a light way from the optical recording medium to the light detector.

* * * * *